United States Patent
Liu et al.

(10) Patent No.: US 7,552,465 B2
(45) Date of Patent: Jun. 23, 2009

(54) METHOD AND APPARATUS FOR TIME-BASED COMMUNICATIONS PORT PROTECTION

(75) Inventors: Zhen Liu, Tarrytown, NY (US);
Dimitrios Pendarakis, Westport, CT (US); Jeremy I. Silber, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 813 days.

(21) Appl. No.: 10/968,704

(22) Filed: Oct. 19, 2004

(65) Prior Publication Data

US 2006/0085842 A1   Apr. 20, 2006

(51) Int. Cl.
G06F 7/04 (2006.01)
G06F 17/30 (2006.01)
G06K 9/00 (2006.01)
H04L 9/32 (2006.01)
G06F 7/58 (2006.01)
G06F 15/16 (2006.01)
G06K 19/00 (2006.01)

(52) U.S. Cl. .......................................... 726/4

(58) Field of Classification Search ............. 726/4
See application file for complete search history.

(56) References Cited

U.S. PATENT DOCUMENTS

2002/0196769 A1* 12/2002 Ohmi et al. ............. 370/343

FOREIGN PATENT DOCUMENTS

CN    1395374    2/2003

OTHER PUBLICATIONS

Wi-Fi Protected Access: Strong, standards-based, interoperable security for today's Wi-Fi networks; Wi-Fi Alliance, Apr. 29, 2003, p. 1.*

* cited by examiner

Primary Examiner—Kambiz Zand
Assistant Examiner—James Turchen

(57) ABSTRACT

One embodiment of the present method and apparatus for time-based communications port protection includes generating a transmission period schedule that is known only by authorized network users including a server and one or more clients of the server. The transmission period schedule dictates pre-defined times at which the server and clients may communicate, e.g., to transfer data. By communicating only at these secret, pre-defined times, the likelihood that an unauthorized party will be able to disrupt service to the clients is greatly reduced.

13 Claims, 3 Drawing Sheets

METHOD AND APPARATUS FOR TIME-BASED COMMUNICATIONS PORT PROTECTION

BACKGROUND

The present invention relates generally to communications networks, and relates more particularly to methods for preventing unauthorized access to communications networks.

Conventional communications networks, e.g., networks that carry traffic between a server and one or more authorized users or clients, are often subject to traffic from unauthorized users designed, for example, to gain unauthorized entry to the network or to waste the network's resources in an attempt to deny service to authorized users. Denial-of-service (DoS) attacks, including attempts by unauthorized users to waste system resources such as central processing unit (CPU) time, I/O bandwidth, memory, and the like are increasingly common and are particularly difficult to guard against. It is therefore exceedingly difficult for authentication systems, which authorize network users, to provide access for legitimate users while simultaneously denying access to unauthorized users without expending significant network resources.

Thus, there is a need in the art for a method and apparatus for time-based communications port protection.

SUMMARY OF THE INVENTION

One embodiment of the present method and apparatus for time-based communications port protection includes generating a transmission period schedule that is known only by authorized network users including a server and one or more clients of the server. The transmission period schedule dictates pre-defined times at which the server and clients may communicate, e.g., to transfer data. By communicating only at these secret, pre-defined times, the likelihood that an unauthorized party will be able to disrupt service to the clients is greatly reduced.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for time-based communications port protection. In one embodiment, a method is implemented that allows network access only during specific, pre-designated periods. The network access periods are generated using a secret key, so that the times and durations of the periods are unknowable and unpredictable to all but authorized network users (e.g., servers, clients and trusted third parties) sharing the secret key.

Figure 1:
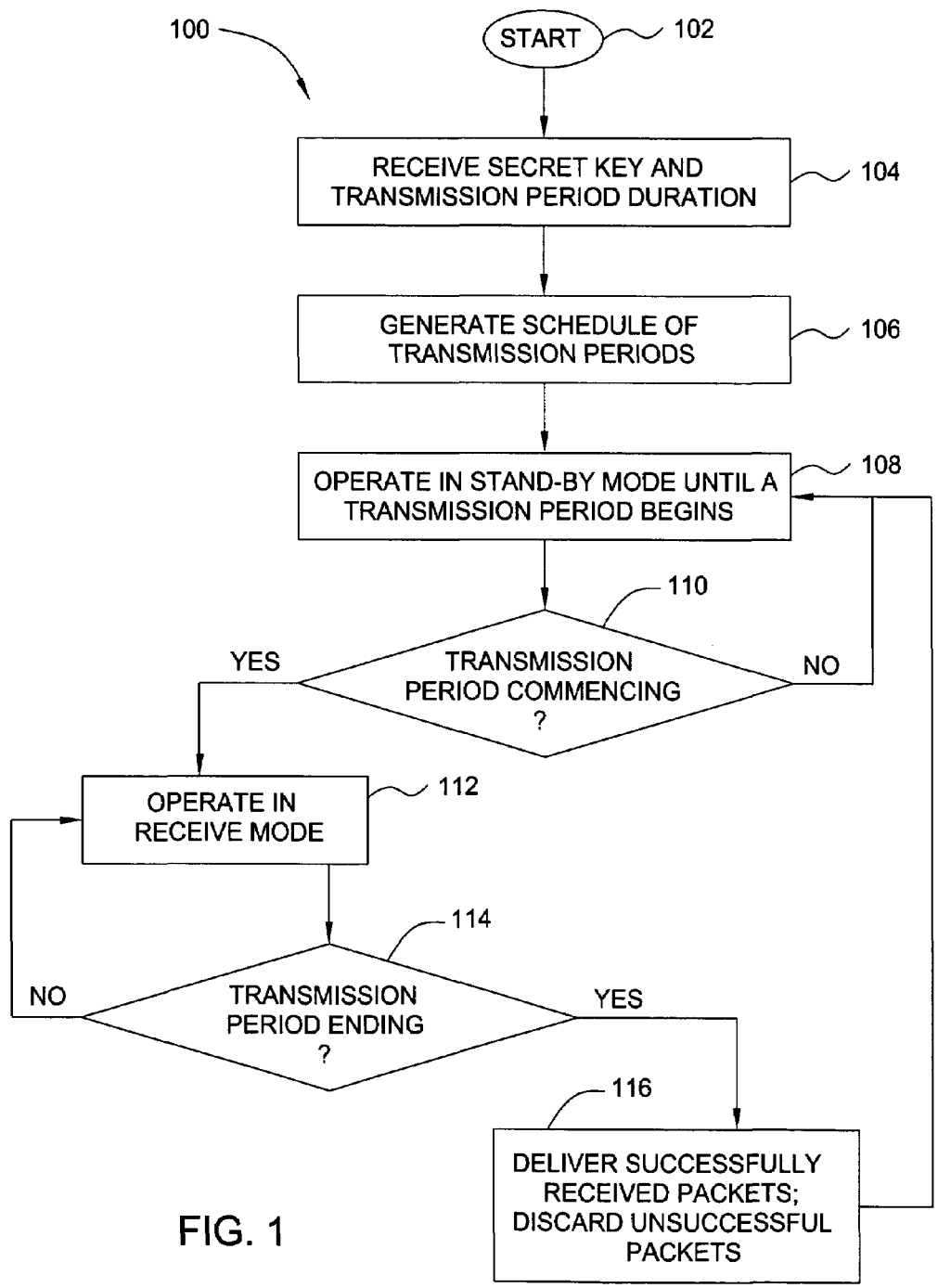
FIG. 1 is a flow diagram illustrating one embodiment of a method for receiving communications over a protected network, according to the present invention.

FIG. 1 is a flow diagram illustrating one embodiment of a method 100 for receiving communications over a protected network, according to the present invention. The method 100 is implemented at, for example, a server that listens for communications requests, e.g., from one or more users or clients. The method 100 is initialized at step 102 and proceeds to step 104, where the method 100 generates or receives (e.g., as input) a secret key and a transmission period duration. In one embodiment, the secret key and transmission period duration are distributed by a trusted third party that authenticates network users (e.g., servers and clients). In one embodiment, the transmission period duration specifies for how long a future transmission period (e.g., in which the server "listens" for communications requests) should last.

In step 106, the method 100 generates a schedule of future transmission periods. In one embodiment, the method 100 generates one or more specific future times, each of which represents a start of a valid transmission period (each transmission period lasting as long as specified by the transmission period duration received in step 104). This schedule is generated in a manner such that transmission period start times, and, optionally, durations are unpredictable to unauthorized users.

In one embodiment, the schedule of future transmission times is generated using a formula, function or secret rules shared only by a server and one or more authorized clients coupled to the server. In one embodiment, the schedule of future transmission periods is generated using the secret key received in step 104. In another embodiment, the schedule of future transmission periods is generated using both the secret key and a cryptographic one-way function. The one-way function may be pre-defined, universally known, or selected from a group of known one-way functions. In one embodiment, transmission period start times are generated as an increasing sequence of numbers, e.g., by using the one way function to compute the difference between the $(n+1)^{th}$ and the $n^{th}$ starting times. In further embodiments, other methods may be used to calculate the schedule of future transmission times.

In step 108, the method 100 operates in a default stand-by mode, e.g., a non-communications receiving mode. Then in step 110, the method 100 inquires whether a scheduled transmission period (e.g., as scheduled in step 106) is commencing or is about to commence. If the method 100 concludes that a scheduled transmission period is not commencing (or is not about to commence), the method 100 returns to step 108 and continues to operate in stand-by mode.

Alternatively, if the method 100 concludes in step 110 that a scheduled transmission period is commencing (or is about to commence), the method 100 proceeds to step 112 and switches to receive mode, e.g., in which the method 100 is enabled to listen for and receive communications requests. In step 114, the method 100 inquires whether the transmission period is concluding, e.g., in accordance with the transmission period duration information received at step 104.

If the method 100 concludes in step 114 that the transmission period is not concluding, the method 100 returns to step 112 and continues to operate in receive mode. Alternatively, if the method 100 concludes in step 114 that the transmission period is concluding, the method 100 proceeds to step 116 and delivers, e.g., to an interface, any data packets or communications that were successfully received during the scheduled transmission period. At the same time, the method 100 discards (e.g., with no further processing) any packets that were not "successfully" received, or transmission of which did not begin within the transmission period, thereby enabling the method 100 to reject most or all unauthorized packets without expending additional network resources. In one embodiment, determination of whether a packet was "successfully" received involves at least one of a packet checksum, a digital signature, or a minimum/maximum packet length check (e.g., enforcing a minimum packet length makes it more difficult to attack the network with "brute force").

In one embodiment, if the method 100 detects that a packet is starting to be received during a scheduled transmission period, but is not completely received by the time the transmission period is scheduled to conclude, the method 100 may delay conclusion of the transmission period until the packet transmission is completed (or until a maximum packet length timeout expires). The method 100 then returns to step 108 and operates in stand-by mode until the commencement of the next scheduled transmission period.

Figure 2:
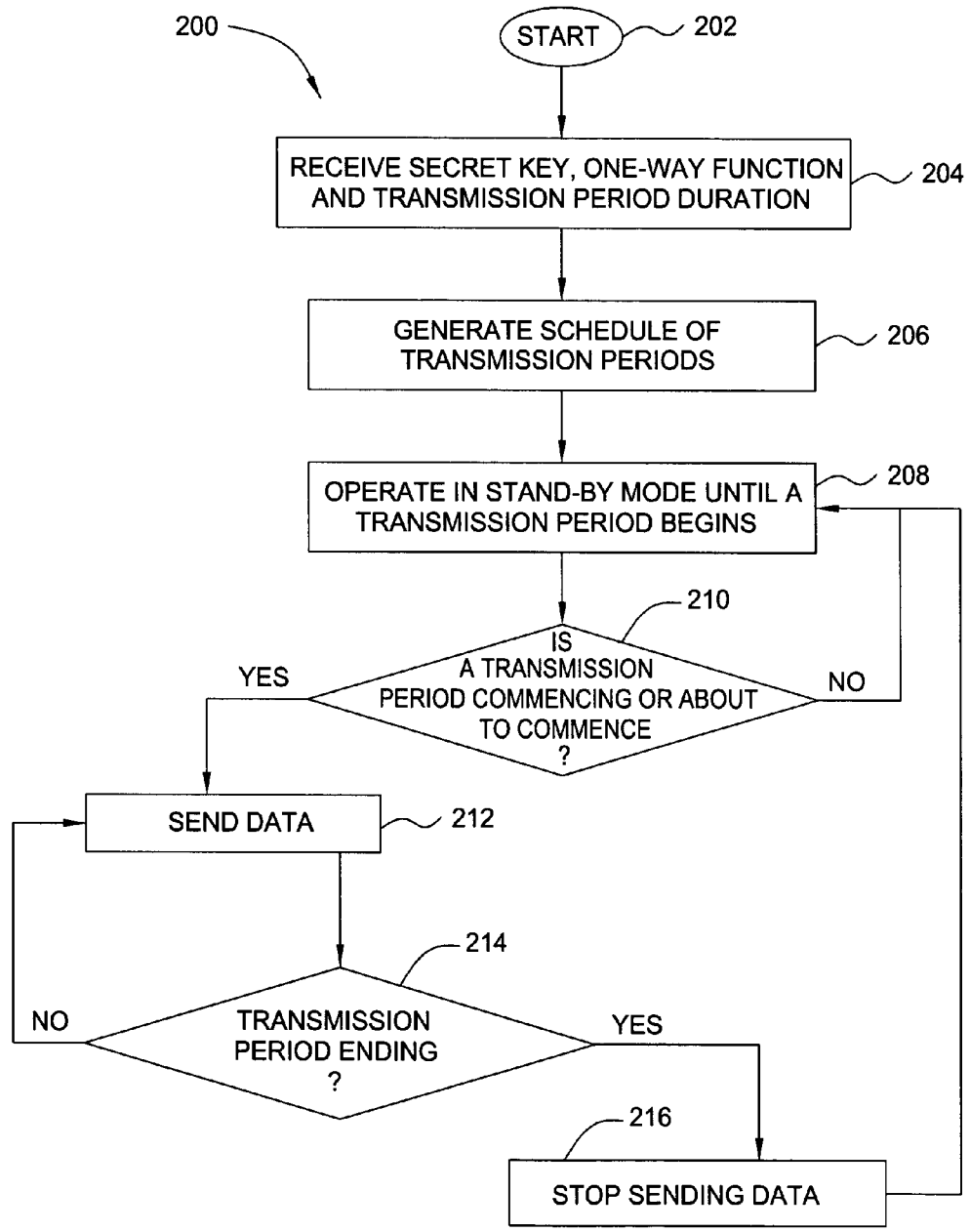
FIG. 2 is a flow diagram illustrating one embodiment of a method for sending communications over a protected network, according to the present invention.

FIG. 2 is a flow diagram illustrating one embodiment of a method 200 for sending communications over a protected network, according to the present invention. The method 200 is implemented at, for example, a client or network user that initiates or sends communications requests, e.g., to a server. The method 200 is initialized at step 202 and proceeds to step 204, where the method 200 receives (e.g., as input) the secret key, transmission period duration and one-way function that are currently in use by the server with which the client is communicating (e.g., the information used in step 106 of the method 100). In one embodiment, this information is received by the method 200 ahead of a first scheduled transmission period. In another embodiment, the method 200 actively retrieves this information on demand, e.g., from a trusted third party. In one embodiment, access to the secret key is the only distinction between an authorized network user and an unauthorized user, and the means by which the method 200 obtains this information includes authentication and authorization processes.

In step 206, the method 200 generates a schedule of future transmission periods, e.g., using the secret key, transmission period duration and one-way function received in step 204. Thus, the schedule of future transmission times generated in step 206 is identical to the schedule generated at the server in step 106 of the method 100. It is assumed that a clock by which the method 200 operates is synchronized with a clock by which the method 100 operates (e.g., via a network time synchronization protocol).

In step 208, the method 200 operates in a default stand-by mode, e.g., a non-communications sending mode. The stand-by mode is relative only to the server with which the client (e.g., the client at which the method 200 is implemented) shares the particular secret key received in step 204; that is, the client may communicate with other network users during this stand-by time and may not necessarily be completely idle. Then in step 210, the method 200 inquires whether a scheduled transmission period (e.g., as scheduled in step 206) is commencing or is about to commence. If the method 200 concludes that a scheduled transmission period is not commencing (or is not about to commence), the method 200 returns to step 208 and continues to operate in stand-by mode.

Alternatively, if the method 200 concludes in step 210 that a scheduled transmission period is commencing (or is about to commence), the method 200 proceeds to step 212 and sends any data that is ready to be sent to the server, so that the server receives the data during the scheduled transmission period. In one embodiment, sending data to the server during the scheduled transmission period entails sending the data before the actual start of the transmission period, in order to compensate for latencies along the transmission path.

In step 214, the method 200 inquires whether the transmission period is concluding. If the method 200 concludes in step 214 that the transmission period is not concluding, the method 200 returns to step 212 and continues to send any data that is ready to be sent to the server. Alternatively, if the method 200 concludes in step 214 that the transmission period is concluding, the method 200 proceeds to step 216 and stops sending data to the server. The method 200 then returns to step 208 and operates in stand-by mode until the commencement of the next scheduled transmission period.

Thus, the method 100, in combination with the method 200, establishes a schedule for data transmission that is substantially impervious to access by unauthorized users. Because only authorized users have the secret key with which the transmission periods are scheduled, unauthorized parties cannot know the transmission schedule in use by the server and the authorized client(s). Thus, even if an unauthorized party knows the transmission protocols used by the server and the authorized clients (including the one-way function) and has compatible software, the unauthorized party cannot know when the server will be receptive to traffic. The most that an unauthorized party can do is send packets and hope that the packets arrive at the server during a scheduled transmission period. This possibility can be made even more unlikely by ensuring that scheduled transmission periods represent a very small proportion of the total system time (e.g., the percentage of which may vary according to the service being provided), so that the server is rarely in receive mode.

In further embodiments, the transmission period duration is randomly generated, so that each scheduled transmission period has a different duration. In this case, the transmission period durations are generated according to a schedule known only by the server and authorized clients/users, e.g., in a manner similar to that in which transmission period start times are generated (using, for example, a different one-way function and secret key shared by the server and the authorized clients).

In other embodiments, e.g., where bidirectional communication is taking place, a single device on the network can be both a "client" (e.g., when initiating a communication) and a "server" (e.g., when receiving a communication).

Figure 3:
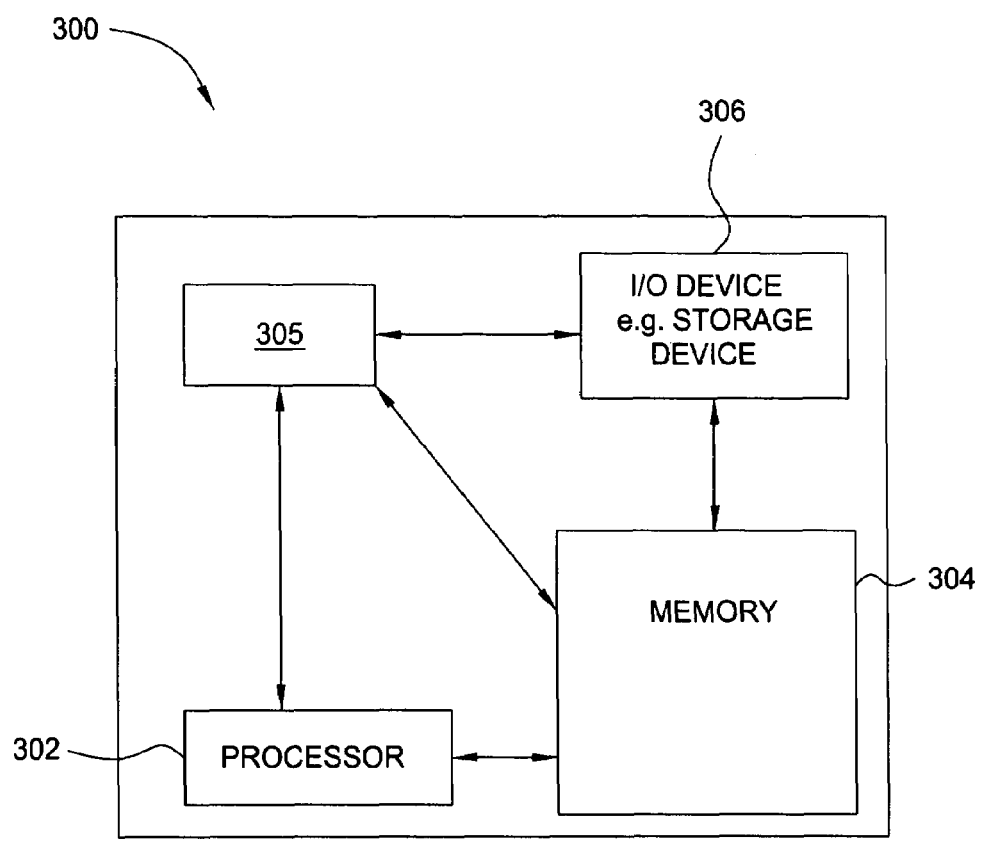
FIG. 3 is a high level block diagram of the present communications port protection method that is implemented using a general purpose computing device.

FIG. 3 is a high level block diagram of the present communications port protection method that is implemented using a general purpose computing device 300. In one embodiment, a general purpose computing device 300 comprises a processor 302, a memory 304, port protection module 305 (e.g., for use at a server serving one or more clients) and various input/output (I/O) devices 306 such as a display, a keyboard, a mouse, a modem, and the like. In one embodiment, at least one I/O device is a storage device (e.g., a disk drive, an optical disk drive, a floppy disk drive). It should be understood that the port protection module 305 can be implemented as a physical device or subsystem that is coupled to a processor through a communication channel.

Alternatively, the port protection module 305 can be represented by one or more software applications (or even a combination of software and hardware, e.g., using Application Specific Integrated Circuits (ASIC)), where the software is loaded from a storage medium (e.g., I/O devices 406) and operated by the processor 302 in the memory 304 of the general purpose computing device 300. Thus, in one embodiment, the port protection module 305 for protecting communications ports against unauthorized access described herein with reference to the preceding Figures can be stored on a computer readable medium or carrier (e.g., RAM, magnetic or optical drive or diskette, and the like).

Thus, the present invention represents a significant advancement in the field of communications networks. A method and apparatus are provided that enable authorized users to communicate with a server while protecting the network against access by unauthorized parties (e.g., for the purposes of denying or inhibiting service to the authorized users). Moreover, the method may be implemented in both wired and wireless communications networks, and may be particularly useful when implemented in wireless communications devices, which are especially vulnerable to such attacks.

While foregoing is directed to the preferred embodiment of the present invention, other and further embodiments of the invention may be devised without departing from the basic scope thereof, and the scope thereof is determined by the claims that follow.

The invention claimed is:

1. A method for transferring data from a first authorized network user to a second authorized network user via a server, said method comprising:
   generating a transmission period schedule that dictates times at which data is allowed to be transferred, said schedule being known only among authorized network users including said first authorized network user and said second authorized network user, wherein said transmission period schedule is generated using a secret key, a specified transmission period duration, and a one-way function; and
   enabling transmission of data between said first authorized network user and said second authorized network user only during one or more transmission periods specified by said transmission period schedule,
   wherein said transmission period schedule is generated independently by each of said server, said first authorized network user, and said second authorized network user using said secret key, said specified transmission period duration, and said one-way function.

2. The method of claim 1, wherein said transmission period schedule is generated in a manner such that a duration, a start time, or both the duration and the start time of said one or more transmission periods are unpredictable to unauthorized users.

3. The method of claim 1, wherein said generating step comprises:
   establishing one or more start times at which said one or more transmission periods will commence, each of said one or more transmission periods being of a pre-defined duration.

4. The method of claim 3, wherein said one or more start times comprises an increasing sequence of numbers.

5. The method of claim 3, wherein said one or more start times are randomly generated.

6. The method of claim 3, wherein said enabling step comprises:
   operating in a stand-by mode as a default;
   switching to a receive mode at or just before a scheduled start time for one of said one or more transmission periods, where said receive mode comprises listening for communications; and
   switching back to said stand-by mode at a conclusion of said one of said one or more transmission periods.

7. The method of claim 6, further comprising:
   receiving a portion of a data packet prior to a scheduled conclusion of said one of said one or more valid transmission periods; and
   delaying an actual conclusion of said one of said one or more transmission periods until said data packet is completely received, or until a maximum packet length timeout expires.

8. The method of claim 7, wherein a successful receipt of a data packet is determined by at least one of: a packet checksum, a digital signature, or a minimum or maximum packet length check.

9. The method of claim 6, further comprising the steps of:
   delivering to said second authorized network user any data packets that are successfully received at said server from said first authorized network user during said one of said one or more transmission periods; and
   discarding any data packets that are not successfully received during said one of said one or more transmission periods or that did not begin to arrive until after said one of said one or more transmission periods.

10. The method of claim 9, wherein a successful receipt of a data packet is determined by at least one of: a packet checksum, a digital signature, or a minimum or maximum packet length check.

11. The method of claim 3, wherein said enabling step comprises:
    sending one or more data packets at or just before a scheduled start time for one of said one or more transmission periods; and
    ceasing to send data packets at or before a conclusion of said one of said one or more transmission periods.

12. The method of claim 11, wherein at least one of said sent packets includes at least one of: a packet checksum, a digital signature, or a minimum or maximum packet length check.

13. The method of claim 1, wherein said transmission of data occurs between the first authorized network user and a set of two or more second authorized network users.

* * * * *